United States Patent [19]

Farkas et al.

[11] Patent Number: 5,661,967
[45] Date of Patent: Sep. 2, 1997

[54] METHOD OF OPERATING A SEQUENTIALLY FIRED GAS-TURBINE GROUP

[75] Inventors: Franz Farkas, Zürich; Peter Rufli, Fislisbach, both of Switzerland

[73] Assignee: Asea Brown Boveri AG, Baden, Switzerland

[21] Appl. No.: 609,829

[22] Filed: Mar. 1, 1996

[30] Foreign Application Priority Data

Apr. 24, 1995 [DE] Germany .................. 195 14 991.2

[51] Int. Cl.⁶ ........................................ F02C 7/26
[52] U.S. Cl. .................. 60/39.04; 60/39.141; 60/39.29
[58] Field of Search .................... 60/39.04, 39.06, 60/39.141, 39.17, 39.182, 39.29

[56] References Cited

U.S. PATENT DOCUMENTS

| | | | |
|---|---|---|---|
| 3,470,691 | 10/1969 | Smith | 60/39.141 |
| 3,974,645 | 8/1976 | Smith | 60/39.29 |
| 4,270,344 | 6/1981 | Yu | 60/39.161 |
| 5,224,337 | 7/1993 | Morishita et al. | 60/39.29 |

FOREIGN PATENT DOCUMENTS

| | | |
|---|---|---|
| 0321809B1 | 6/1989 | European Pat. Off. |
| 6-129264 | 5/1994 | Japan . |

*Primary Examiner*—Louis J. Casaregola
*Attorney, Agent, or Firm*—Burns, Doane, Swecker & Mathis, L.L.P.

[57] ABSTRACT

In a method for operating a sequentially fired gas-turbine group, during starting the inlet guide row in the compressor (12) is opened up to a maximum up to the pumping limit of the same. The ignition (2) of the first combustion chamber (13) takes place below the rated speed during idling of this gas-turbine group with the opening of the inlet guide row remaining constant, then the inlet guide row is opened further until the rated speed is reached during idling. The ignition of the second combustion chamber (15) takes place during operation at this rated speed and with the opening of the inlet guide row remaining constant. The inlet guide row is then accordingly opened further at constant rated speed until full load (6) is reached.

3 Claims, 1 Drawing Sheet

METHOD OF OPERATING A SEQUENTIALLY FIRED GAS-TURBINE GROUP

BACKGROUND OF THE INVENTION

1. Field of the Invention

The present invention relates to a method according to the preamble of claim 1.

2. Discussion of Background

To control the entire operating behavior in a sequentially fired gas-turbine group which essentially comprises a compressor unit, a high-pressure and a low-pressure combustion chamber, and a high-pressure and low-pressure turbine, it has become known to decrease the significant temperatures at various points of the gas-turbine group and to accordingly influence the mode of operation. Metering of the two fuel quantities for the combustion chambers which is dependent on a control system should be effected in such a way that at least the outlet temperature of the hot gases of the respective combustion chamber ought to be sensed directly. However, such temperature sensing is difficult to effect and its reproducibility is not ensured, so that a reliable mode of operation with the aid of fuel control which is based on uncertain measurements cannot be guaranteed. It is certainly true that the mode of operation would also be assisted with the aid of other operational parameters which could be included by way of assistance; however, it is also always necessary here to influence the temperatures and consequently the control is also based here exclusively on dynamic fuel metering, which without doubt is difficult to realize.

SUMMARY OF THE INVENTION

Accordingly, one object of the invention, in a method of the type mentioned at the beginning, is to activate all operating points of the gas-turbine group according to a reliable control concept both when putting the gas-turbine group into and out of operation.

The essential advantage of the invention may be seen in the fact that all operating states of the gas-turbine group are influenced by at least one inlet guide row in the compressor, which inlet guide row has a multi-functional effect on the mode of operation of the gas-turbine group in both operating directions.

Advantageous and expedient further developments of the achievement of the object according to the invention are defined in the further dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
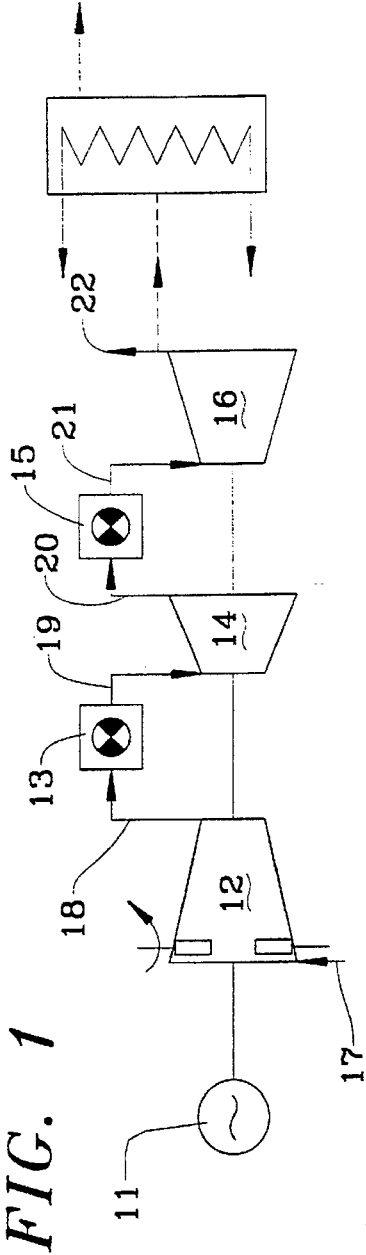
FIG. 1 shows a schematic of a gas-turbine group with sequential firing.
Figure 2:
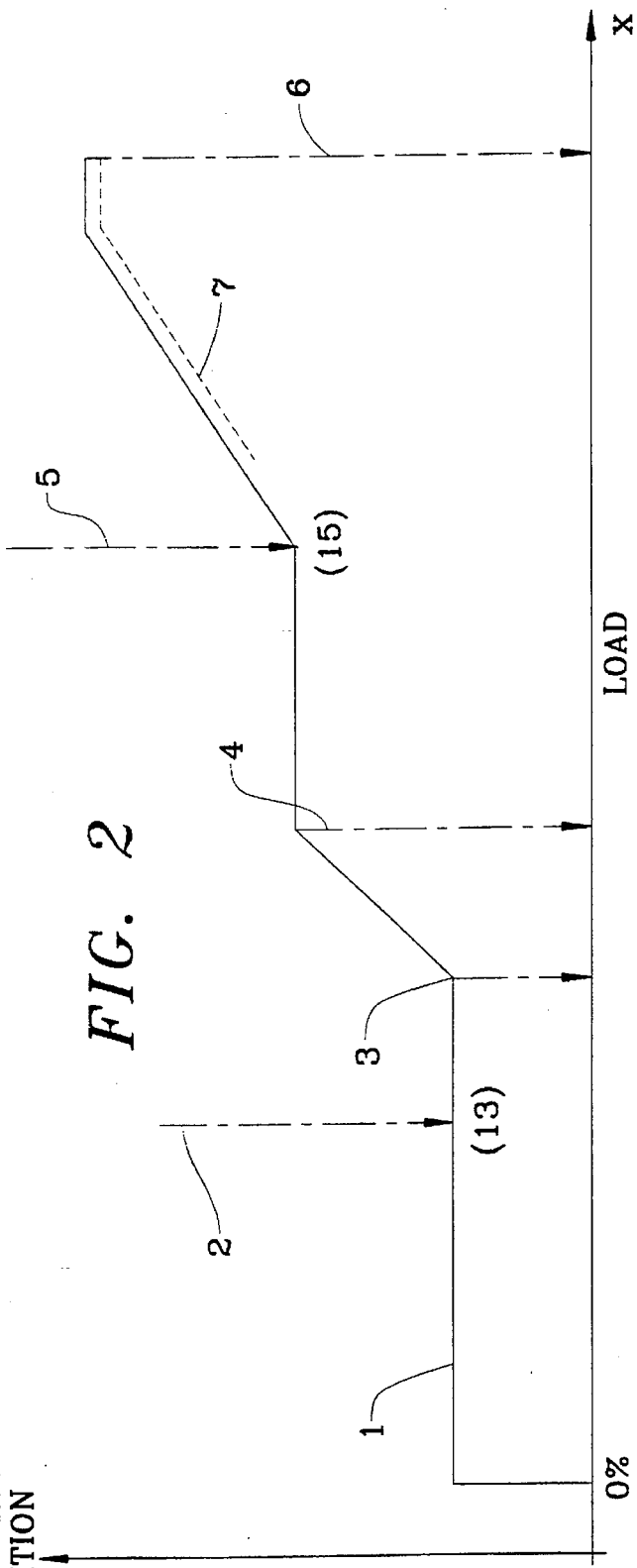
FIG. 2 shows a control diagram of the progression of the load as a function of the adjustment of the inlet guide row in the compressor.

Referring now to the drawings, wherein like reference numerals designate identical or corresponding parts throughout the several views, FIGS. 1 and 2 are used at the same time in any sequence in the description below.

FIG. 2 shows a diagram in which start-up, load operation and part-load operation of a gas-turbine group according to FIG. 1 are shown. The abscissa X symbolizes the load in %, while the ordinate Y indicates the qualitative adjustment of the inlet guide row in the compressor 12. The basis for this gas-turbine group according to FIG. 1 is that it consists of a compressor unit 12, in which the compression of the intake air 17 takes place. The compressed air 18 then flows into a first combustion chamber 13 in which hot gases are provided preferably by the use of premix burners, as is apparent from EP-B1-0 321 809, the teaching of this publication being an integral part of this embodiment. These hot gases 19 are then admitted to a first turbine 14 which is designed only for partial expansion in such a way that the exhaust gases 20 flowing out of it are still at a relatively high temperature. These exhaust gases 20 then flow into a second combustion chamber 15 in which ignition is initiated by the fuel injected there, whereby hot gases 21 are in turn prepared in the same thermal stage for admission to a second turbine 16 arranged downstream. The residual thermal potential of the exhaust gases 22 from the second turbine 16 is preferably used for generating steam, either for feeding this steam back into the gas-turbine group (STIG operation) or for operating a downstream steam cycle. Since the machine in this case is a single-shaft machine, the energy conversion may be effected by a single generator 11.

During the starting 1 according to FIG. 2, the gas-turbine group is started up with the inlet guide row firmly closed. This measure reduces in particular the mass flow, that is the intake air 17, the starting output and the alternating bending loads on the blades. Therefore, the rotating-stall cells potentially arising in the compressor 12 are avoided during this starting phase. The correct ignition state 2 for the first combustion chamber 13 put into operation first, which ignition state 2 depends on the correct air/fuel ratio, is found upon reaching ignition rotational speed by means of a corresponding corrected adjustment of the inlet guide row, the extent of which represents the pumping limit of the compressor 12. The adjustment of the inlet guide row, after ignition 2 of the first combustion chamber 13 takes place, makes the compressor quantity suitable both for activation of the part-load operation and for the full-load operation itself. The part-load operation will be dealt with in more detail further below. After the ignition 2 of the first combustion chamber 13, the position of the inlet guide row is kept constant for a brief period, as apparent from FIG. 2. Directly thereafter, the rotational speed is increased to idling 4 by further opening of the inlet guide row, namely to 100% of the rated speed at zero load, in order to then remain constant up to low part load (about 50% of full load). The ignition 5 of the second combustion chamber 15 then takes place at this level. When the rotational speed is constant, the load of the gas-turbine group is successively increased to full load 6 by further adjustment of the inlet guide row in the opening direction, the inlet guide row being provided with a certain adjustment reserve. The ignition of the second combustion chamber 15 takes place at the correct moment with the aid of the activated position of the inlet guide row. The adjustment of the inlet guide row enables the quantity of compressed air 18 from the compressor 12 to be determined both for activation of the part-load operation and for the full-load operation after ignition 5 takes place. As far as the provision of the part-load operation 7 is concerned, this is obtained by an appropriate combination between adjustment of the inlet guide row and appropriate throttling back of the fuel quantity to the second combustion chamber 15. This combination makes it possible in part-load operation to optimize the temperature and the efficiency in such a way that, in both individual operation of the gas-turbine group and STIG operation or combined cycle operation, any desired temperature of the exhaust gases 22 from the second turbine 16 can be maintained. Due to the aforesaid air reserve at full load resulting from the adjustability of the inlet guide row, it is possible to achieve flexibility of certain guaranteed data. A "fired shutdown" can be avoided due to the large adjusting range of the inlet guide row. Quick fuel shutoff is initiated during idling 4, which enables the machine to slow down with open blow-out valves and inlet guide row closed relatively firmly. Rapid cooling of the machine, which may lead to a thermal shock and distortions, is avoided by this throttling of the airflow quantity. From a fixed minimum rotational speed following the quick fuel shutoff, the inlet guide row is completely closed, i.e. metal is run on metal, as a result of which further throttling and heat conservation of the machine are achieved. The highly stressed parts are substantially protected by these measures in such a way that, thanks to the large adjusting potential of the inlet guide row considered here, thermal cycles result which are not so full as would otherwise normally be the case. When stopped, the machine is then kept warm by the fully closed inlet guide row and is therefore conserved in the sense that it is exposed to virtually no draft when stopped. In addition, this heat conservation greatly inhibits corrosion from any condensation in the flow system. Furthermore, these advantages always become particularly apparent when the machine often has to be re-started after briefly putting it out of operation, thus enabling its thermal cycle to be substantially preserved.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of operating a sequentially fired gas-turbine group, essentially comprising a compressor unit, a first combustion chamber which is arranged downstream of the compressor unit and whose hot gases are admitted to a first turbine arranged downstream, a second combustion chamber which is arranged downstream of the first turbine and whose hot gases are admitted to a second turbine arranged downstream, and at least one generator, wherein, during starting (1), at least one inlet guide row in the compressor (12) is opened up to a maximum up to the pumping limit of the same, wherein the ignition (2) of the first combustion chamber (13) takes place below the rated speed during idling (4) of the gas-turbine group with the opening of the inlet guide row remaining constant, wherein, after the ignition (2) of the first combustion chamber (13), the inlet guide row is opened further until the rated speed is reached during idling (4), wherein the ignition (5) of the second combustion chamber (15) takes place during operation at this rated speed and with the opening of the inlet guide row remaining constant, and wherein the inlet guide row is then opened successively at constant rated speed until full load (6) of the gas-turbine group is reached.

2. The method as claimed in claim 1, wherein part-load operation (7) is effected simultaneously by throttling back the fuel quantity to the second combustion chamber (15) and closing the inlet guide row in the compressor (12).

3. The method as claimed in claim 2, wherein, in combined cycle operation, the temperature of the exhaust gases (22) from the second turbine (16) is kept level by regulating the inlet guide row in the compressor (12).

\* \* \* \* \*